Nov. 10, 1925.  
C. E. JOHNSON  
1,561,446  
METHOD OF PATTERN OR RING FORMING FOR PISTON RINGS  
Filed June 14, 1922  2 Sheets-Sheet 1

Inventor  
Charles E. Johnson.  
By Frank E. Liverance, Jr.  
Attorney.

Patented Nov. 10, 1925.

1,561,446

UNITED STATES PATENT OFFICE.

CHARLES E. JOHNSON, OF MUSKEGON, MICHIGAN, ASSIGNOR TO THE PISTON RING COMPANY, OF MUSKEGON, MICHIGAN, A CORPORATION OF MICHIGAN.

METHOD OF PATTERN OR RING FORMING FOR PISTON RINGS.

Application filed June 14, 1922. Serial No. 568,280.

*To all whom it may concern:*

Be it known that I, CHARLES E. JOHNSON, a citizen of the United States of America, residing at Muskegon, in the county of Muskegon and State of Michigan, have invented certain new and useful Improvements in Methods of Pattern or Ring Forming for Piston Rings; and I do hereby declare the following to be a full, clear, and exact description of the invention, such as will enable others skilled in the art to which it appertains to make and use the same.

This invention relates to a method of pattern or ring forming for the proper shaping of patterns for the production of out-of-round ring castings used in the manufacture of piston rings in accordance with the processes disclosed in Patents No. 1,050,102, granted Jan. 14, 1913 to Donald J. Campbell, and No. 1,405,577, granted Feb. 7, 1922, to myself. This process or method forming the subject matter of the present invention is also applicable for the shaping of ring castings after they are made to proper form, after first being cast either individually or in pots in circular form, and cut up into individual rings.

In accordance with the Campbell process, the pattern is formed in the first instance as a circular ring, the length of which is equal to the length of the finished ring to be made plus an allowance for finish and shrinkage. The ring is parted at one side and a gap piece equal to the gap in the finished ring with whatever allowance for finish and shrinkage is necessary is placed between the two ends of the circular ring at the parting and is soldered permanently in place. This pattern ring is fixed to a plate, one or more of them, usually four, and used in the production of moulds for the casting of the ring castings individually. It is apparent that the ring castings are of an out-of-round form, and in making the finished ring, a segment is cut from the casting corresponding to that introduced into the pattern, the ring, when closed, coming to circular form.

Patterns made in this manner are difficult to make properly and require highly skilled tool makers. Their attachment to the plate is also hard to secure without distortion of the patterns due to the soldering of the segment in place which precludes attachment of the patterns to the plate by use of solder. The present invention which I have made has for its primary object and purpose the very ready and easy production of patterns in out of round form with the segment therein as an integral part of the pattern, permitting the attachment of the patterns to the plate without liability to distortion in any way. This obviates the necessity for highly skilled labor and greatly increases the production of patterns and the quality thereof.

For an understanding of the invention by which these ends as well as many others not specifically enumerated are attained, reference may be had to the following description, taken in connection with the accompanying drawing, in which, Fig. 1 is a plan view showing the forming die and the pattern ring around the same before the die is spread to shape the pattern.

Like reference characters refer to like parts in the several figures of the drawing.

In the production of the pattern, the preliminary step is to produce a ring 1 of uniform cross section and of a length equal to the length of the finished ring to be made from rings cast from the pattern, plus allowances for shrinkage and finish, plus an additional allowance for the segment piece to be cut from the ring castings in completing the ring castings into finished piston rings. This ring 1 may be of any suitable material and is to be circular in shape.

The die 2 is also circular in shape when closed, its outside diameter in closed position being equal to the inside diameter of the piston ring to be made, with an addition for shrinkage and whatever is needed for finish. The die is parted at one side, at 3 and at such parting the ends are cut to make two inclined surfaces 4, the two sides, when the die is closed making a relatively deep V in the upper side of the die, as shown.

Figure 4:
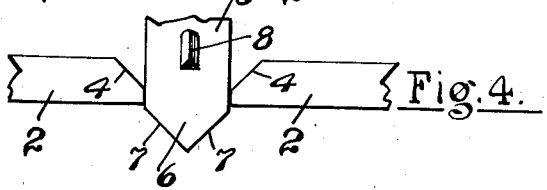
Fig. 4 is a like view with the punch in lower position and spreading the die.
Figure 5:
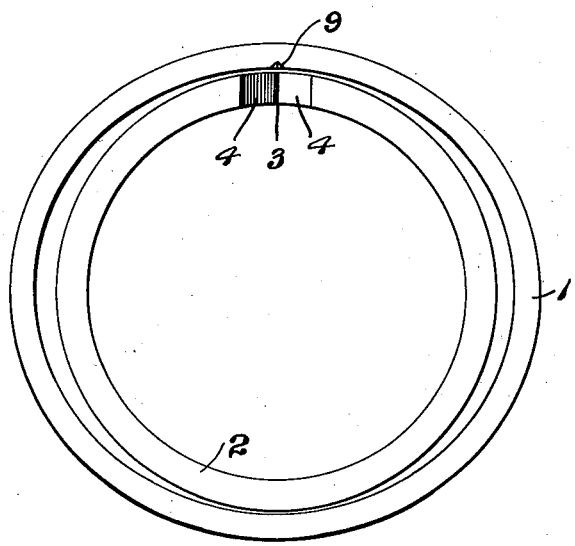

This die is designed to be spread by the passage of a punch 5 between the ends thereof at the parting 3. The punch has a width corresponding to the segment in the pattern and is formed with a pointed lower end 6, the sides 7 of which are inclined to correspond to the inclines at 4 at the ends of the die. On downward movement of the punch, the sides 7 thereof engage the sides 4 of the die, serving to spread the die at the parting, as shown in Fig. 4.

Figure 1:
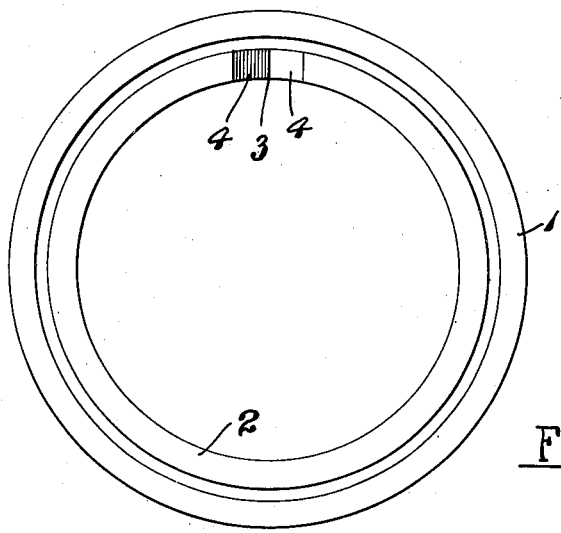
Figure 2:
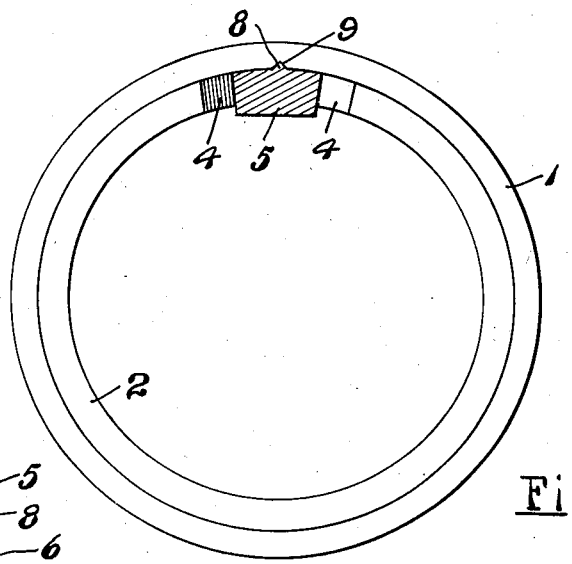
Fig. 2 is a like view showing the dies spread to shape and form the pattern ring, the spreading member or punch acting on the die being shown in section.
Figure 3:
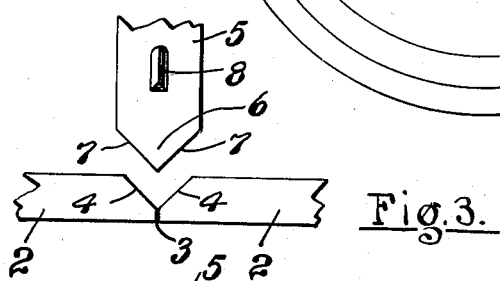
Fig. 3 is a fragmentary side elevation of the die and punch showing the die closed at the parting side and the punch above and out of engagement therewith.

The ring 1 is heated to a suitable temperature so as to readily change shape on application of force thereto and placed over the die and around it, after which the punch is brought downward, forcing the die apart, as indicated in Fig. 2, thus shaping the ring 1 to conform to the distorted out-of-round shape of the die when spread. Of course, in the calculation of the sizes of the die and ring, proper consideration has to be made for the expansion and contraction of the ring when heated and after cooling, but it is evident that a ring pattern is produced which is practically identical with a pattern made by parting a circular ring pattern at one side and introducing a segment therein, as described in the Campbell patent above noted. And this pattern has the advantage that the segment is integral with the pattern and does not have to be secured in place in any manner.

On the punch 5, it is designed that a marking die portion 8 shall be carried so that it comes against the pattern ring 1 on the downward movement of the punch, marking the same with a notch 9, which is reproduced in the ring castings made from the pattern. In the ring castings these markings have to be made in order to indicate the place in each casting where the segment is to be removed in finishing the ring.

The solid pattern ring formed into an out-of-round may be soldered on to a pattern carrying plate without danger of loosening any segment therefrom, and the necessity of attaching the ring patterns to the plate by screws or other similar means is removed. Rapidity in pattern production, uniformity of patterns, the elimination of the personal element and skill of the workman make the invention one of value in so far as pattern production is concerned.

The method is also available and of value in shaping circular ring castings cast either individually or cast in pots and cut individually therefrom. In such case, the ring casting is heated and operated upon by the die in the same manner as the pattern ring 1 is treated, shaping the ring casting to the required out-of-round form called for in the process of making piston rings in the Campbell patent and also in my patent above noted.

I have shown the process of distorting and forming the ring patterns by a die working on the inside of the ring. Obviously, the reverse may be done or the forming made by a die acting against the outer sides of the ring.

The process described is simple, expeditious, produces a uniform and perfect pattern or patterns, and is generally of value in making the patterns, or in forming the ring castings to desired out-of-round form. The claims appended define the invention and I consider the invention to comprehend all structures or instrumentalities coming within their scope.

I claim:

1. The herein described method of changing a continuous circular ring to out-of-round form which consists in placing the ring around a circular die parted at one side and then spreading the die at the parting in the side thereof to change the circular ring to an out-of-round form.

2. The herein described method of shaping a continuous circular ring to an out of round form, which consists in placing the ring, after heating the same to a high degree of temperature, around a circular die parted at one side, and then spreading the die by forcing a member between the ends thereof at said parting, substantially as described.

3. The herein described method of making a pattern for a circular piston ring said pattern to include a segment to be cut out of a ring casting in making the finished ring, which consists in providing a continuous circular ring having a length equal to the length of the finished ring plus allowances for shrinkage and finish, plus the length of the segment to be removed, heating said ring to a high degree of temperature, and then springing a circular die against the inside of the ring, the size of said die at its outer dimensions being substantially equal to the inner dimensions of the ring to be made with allowances for shrinkage and finish, said die being parted at one side and sprung apart at said parting by forcing a member between the ends of the die having a width corresponding to the length of the segment to be removed, in finishing the ring.

4. The herein described method of changing a continuous circular ring to an out of round form, which consists in heating the circular ring to a high degree of temperature, placing it around a die, and then expanding the die whereby the die presses laterally against the inner sides of the ring to change its shape.

In testimony whereof I affix my signature.

CHARLES E. JOHNSON.